United States Patent Office 2,955,098
Patented Oct. 4, 1960

---

2,955,098

POLYETHYLENE COMPOSITIONS OF IMPROVED CLARITY COMPRISING POLYETHYLENE AND A POLYURETHANE AND PROCESS OF MAKING SAME

Anthony Graham Marshall Last, Welwyn Garden City, England, assignor to Imperial Chemical Industries Limited, London, England, a corporation of Great Britain No Drawing. Filed Oct. 21, 1958, Ser. No. 768,539

Claims priority, application Great Britain Oct. 30, 1957

9 Claims. (Cl. 260—45.5)

This invention relates to the mixing of small quantities of certain additives with polyethylene for the purpose of improving the clarity of the latter. Clarity, for the purpose of this specification, is defined as the ability to transmit light without scattering from distant objects. The visibility, sharpness of outline and resolution of detail of distant objects viewed through parallel-sided specimens of polyethylene containing the additives of the invention are greater than they are when the objects are viewed through similar specimens of polythylene that do not contain the additives.

Certain low molecular weight derivatives of urethane, for example benzyl carbamate, N-methyl urethane, phenyl urethane, and also urethane itself, were found to effect very small improvements in clarity and this led to experiments with some of the so-called polyurethanes, for example the condensation products of hexamethylene di-isocyanate and aliphatic diols and triols, for example 1:4 butane diol; these were found markedly to improve the clarity.

According to our invention, a polyethylene composition of improved clarity comprises polyethylene and, incorporated therewith, from 0.001 to 5 parts per 100 parts of polyethylene, by weight, of at least one polyurethane that has a molecular chain length greater than 200 A. in the uncoiled state and at least one crystal unit cell spacing similar to a spacing of the polyethylene crystal unit cell, and a melting point of not less than 120° C.

The preferred proportion of polyurethane in the polyethylene is 0.10 to 0.50 part per 100 parts of polyethylene, by weight. The polyethylene preferably has a density not exceeding 0.94 gm./cc. at 20° C.

The polyurethane may be incorporated with the polyethylene by mixing granules of the two polymers on rolls heated to a temperature above the melting point of the polyurethane, preferably to 190 to 200° C., for about ten minutes. Master batches may be made containing high proportions of polyurethane for subsequent mixing with polyethylene.

The compositions are particularly useful for the production of extruded and moulded products, for the manufacture of which the composition is preferably extruded or moulded at a temperature slightly below the melting point of the polyurethane.

I claim:

1. A polyethylene composition of improved clarity comprising polyethylene and, incorporated therewith, from 0.001 to 5 parts per 100 parts of polyethylene, by weight, of at least one polyurethane comprising the condensation product of a polyisocyanate and an aliphatic polyhydroxy compound, said condensation product having a molecular chain length greater than 200 A. in the uncoiled state and at least one crystal unit cell spacing similar to a spacing of the polyethylene crystal unit cell, and a melting point of not less than 120° C.

2. A composition as claimed in claim 1 in which from 0.10 to 0.50 part of the polyurethane per 100 parts of polyethylene, by weight, is incorporated with the polyethylene.

3. A composition as claimed in claim 1 in which the polyethylene has a density not exceeding 0.94 gm./cc. at 20° C.

4. A process for the production of compositions as claimed in claim 1 that comprises mixing granules of the polyethylene and polyurethane for about ten minutes on rolls heated to a temperature above the melting point of the polyurethane.

5. A process as claimed in claim 4 in which the rolls are heated to a temperature of from 190° to 200° C.

6. A process for extruding a composition as claimed in claim 1 that comprises extruding the composition at a temperature slightly below the melting point of the polyurethane.

7. A process for moulding a composition as claimed in claim 1 that comprises moulding the composition at a temperature slightly below the melting point of the polyurethane.

8. Extruded products comprising a composition as claimed in claim 1.

9. Moulded products comprising a composition as claimed in claim 1.

No references cited.